No. 743,195. PATENTED NOV. 3, 1903.
L. J. REMMELE.
ROTARY BROOM OR BRUSH.
APPLICATION FILED NOV. 7, 1902.
NO MODEL. 2 SHEETS—SHEET 1.

WITNESSES: INVENTOR
Henry Krug Louis J. Remmele,
Russell M. Everett BY
Drake & Co.
ATTORNEYS No. 743,195. PATENTED NOV. 3, 1903.
L. J. REMMELE.
ROTARY BROOM OR BRUSH.
APPLICATION FILED NOV. 7, 1902.
NO MODEL. 2 SHEETS—SHEET 2.
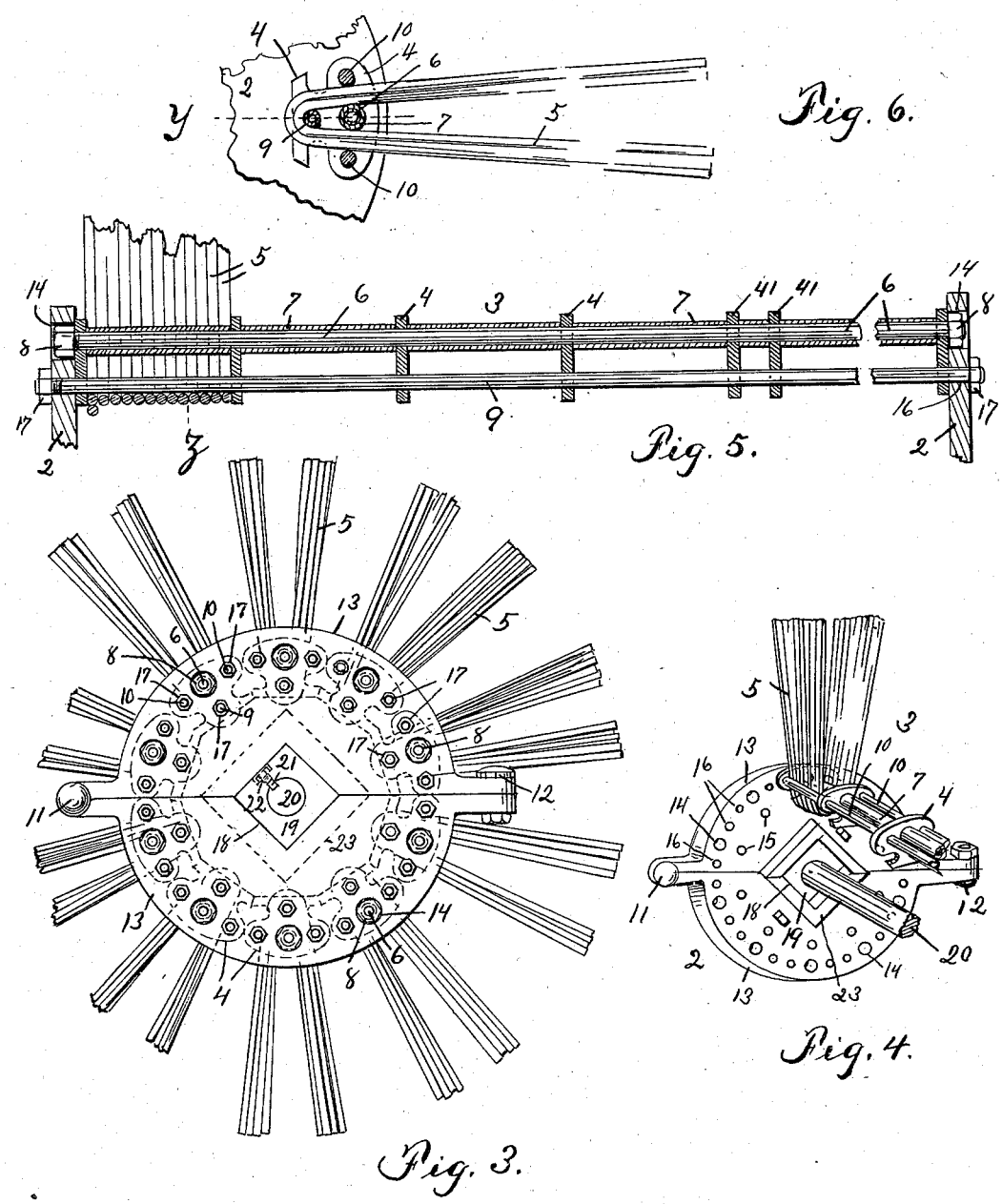

No. 743,195. Patented November 3, 1903.

UNITED STATES PATENT OFFICE.

LOUIS J. REMMELE, OF NEWARK, NEW JERSEY.

ROTARY BROOM OR BRUSH.

SPECIFICATION forming part of Letters Patent No. 743,195, dated November 3, 1903.

Application filed November 7, 1902. Serial No. 130,397. (No model.)

*To all whom it may concern:*

Be it known that I, LOUIS J. REMMELE, a citizen of the United States, residing at Newark, in the county of Essex and State of New Jersey, have invented and produced new and original Improvements in Rotary Brooms or Brushes; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide a rotary brush or broom, such as is used upon street-railways and the like, which is made up of a number of detachable sections; to provide means for solidly and rigidly clamping said sections together to form a complete brush; to secure sections which are each rigid and complete in itself; to enable the sections to be readily and conveniently filled with reeds when disassembled; to secure an improved construction of brush and one especially adapted for filling by means of my improved table shown in my application for patent, Serial No. 130,396, of even date herewith, and to secure other advantages and results, some of which will be hereinafter referred to in connection with the description of the working parts.

The invention consists in the improved rotary brush for street-sweepers and in the arrangements and combinations of parts of the same, all substantially as will be hereinafter set forth and finally embraced in the clauses of the claim.

Figure 1:
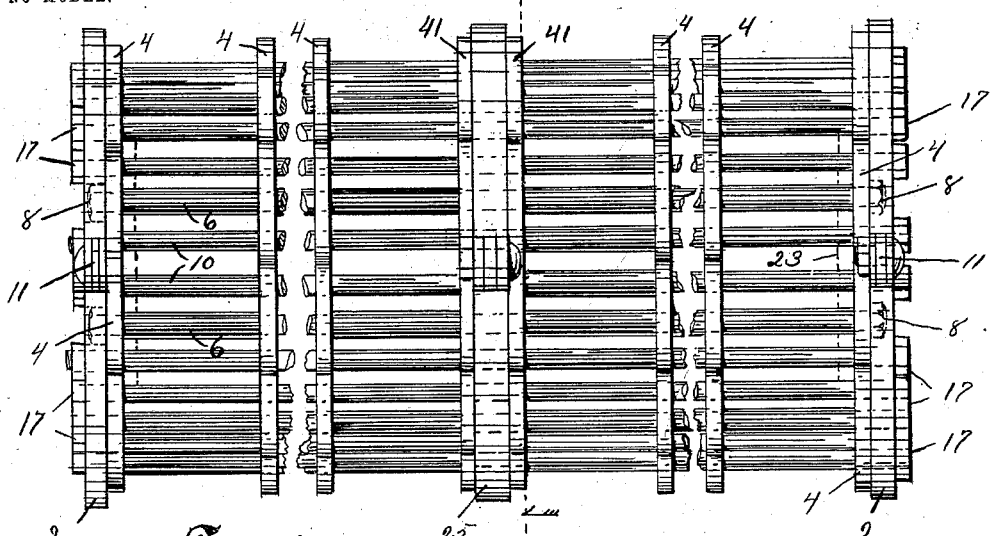
Figure 2:
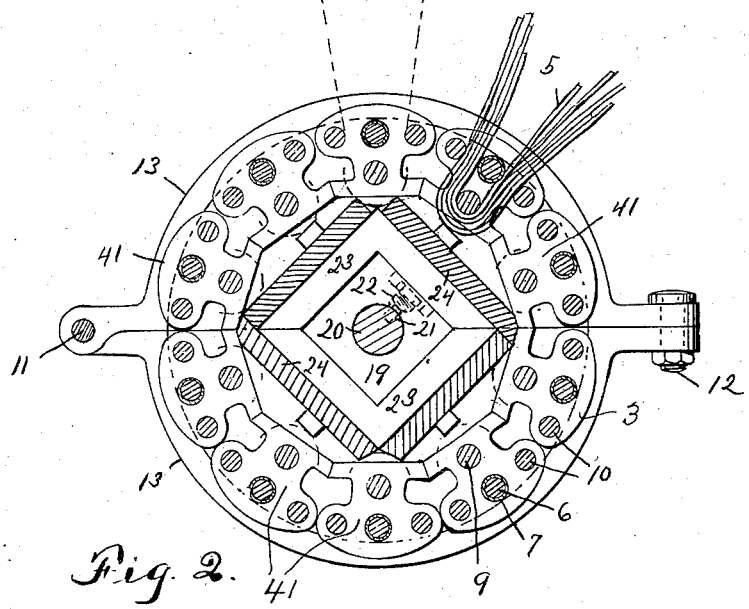

Referring to the accompanying drawings, in which like numerals of reference indicate corresponding parts in each of the several figures, Figure 1 is a side view of a broom of my improved construction, the reeds being entirely removed. Fig. 2 is a cross-sectional view of the said broom, taken on line $x$, Fig. 1. Fig. 3 is an end view of the broom complete and mounted on a shaft. Fig. 4 is a perspective view of a portion of a broom looking toward the end piece or head and all the sections being removed except one, which is shown partially filled with reeds; Fig. 5 is a central longitudinal section through a broom-section mounted in broom-heads, said section being upon a radial plane, as shown by line $y$ in Fig. 6; and Fig. 6 is a cross-sectional view of one broom-section as mounted in the heads, said view being taken upon line $z$, Fig. 5.

In said drawings, 2 2 indicate opposite end pieces or heads of my improved rotary brush or broom, said heads being circular in shape and adapted to receive near their margins the cylindrical series of broom-sections 3, extending in mutual parallel relation from one broom-head to the other and being mounted therein at their extremities. Each of said broom-sections 3 comprises a series of parallel transverse plates 4, adapted to divide the reeds 5 into groups and standing flatwise between said groups of reeds. Said plates 4 are arranged upon four rods extending longitudinally of the broom-section, which rods are arranged three in a row across the outer end of the plates 4, as the broom-section occupies normal position, and one at the middle of the inner ends of said plates. Of said outer three rods the middle one, 6, extends through holes in the several plates 4, and has slipped upon itself between said plates sections 7 of tubing, which serve to keep the plates apart. The ends of said rod 6 extend through the opposite heads 2 2 and are threaded to receive nuts 8, which are screwed tightly in place to serve to bind the rod 6, tube-sections 7, and plates 4 rigidly and permanently together. The rod 9, which lies radially in from the rod 6, just described, or at the inner ends of the plates 4, simply extends through the holes in the series of plates and projects at its ends to be secured to the broom-heads, as hereinafter described. Around said two rods 6 9 the reeds or bristles 5 of the broom are bent, as shown more particularly in Figs. 2 and 6, the said two rods thus lying inside the bend of the reeds before mentioned. Of the other two rods 10 10 of the outer three above referred to one lies on each side of the rod 6, and said outer rods thus serve to hold the reeds in bent position, as clearly shown in Figs. 4 and 6. Said outer rods 10 10 simply extend slidably through their perforations in the series of plates 4 and at the ends project beyond the endmost of said plates for fastening purposes, hereinafter described. The said middle rods 6 and 9 thus form a central portion of the longitudinal broom-section, around which the reeds are bent and which carries the transverse plates 4, while the side rods 10 10 constitute detachable holding means adapted to be fastened to said central portion to hold the reeds in place.

The heads 2 2 are each composed of two semicircular halves 13 13, hinged together at one end of their meeting edges, as at 11, and adapted to be clamped at the other by a bolt 12. Near their margins each broom-head 2 has a series of groups of perforations, each group consisting of four holes, being adapted to receive the ends of the four rods 6 9 10 10 of the brush-section. Two of said holes, as 14 15, lie in a radial line of the brush-head, being adapted to receive the two rods 6 9 lying within the bend of the reeds, and thus insuring a proper radially-projecting position of the reeds 5. The hole 14, adapted to receive the rod 6, having tubular stays 7, is sufficiently large to admit the nut 8 on the end of said rod, so that said nut need not be loosened, as this would permit the broom-section to come apart. The lateral holes 16 16 and the inner hole 15 of the group nicely fit the three rods 10 10 9 of the broom-section, so that the endmost plate 4 is brought flat against the said broom-head. Nuts 17 are then applied to said rods on the outer side of the head, as shown in Figs. 1, 3, and 5, and a firm connection of the broom-section to the heads thereby secured.

Preferably ten of the broom-sections described are mounted to form a complete broom of my improved construction, although it will be evident that the number may be varied as desired.

Each head 2 has at its center a square aperture 18, adapted to receive a similar-shaped block 19, locked on the driving-shaft 20, whereby rotary motion is imparted to the broom. Said block 19 is of any suitable construction in common use, being preferably held to the shaft 20 by a key 21, into which a set-screw 22 extends. Preferably each head is flanged at its inner side along the edges of its opening 18, as at 23, and after the broom-sections are in place in one half of the broom boards 24 are slid inward upon said flanges, as shown in Fig. 2, to prevent any possibility of the reeds slipping backward away from their work. Said boards, it will be understood, extend longitudinally from end to end of the brush, lying between the central shaft 20 and the broom-sections and being inserted sidewise into place before the two halves of the brush are put together.

Preferably I fasten around the middle of my improved broom a ring 25, which locks in place, as do the heads 2 2, and serves to bind together the broom-sections intermediate of their ends, two plates 41 41 in each broom-section being arranged near together to provide a peripheral surface to receive said ring 25 and the space between them being devoid of reeds.

Having thus described the invention, what I claim as new is—

1. A rotary broom, comprising parallel circular end pieces or heads, and broom-sections each adapted to hold a row of reeds extending longitudinally between said heads in an annular series, said broom-sections having longitudinal rods and being supported by the ends of said rods being passed through perforations in the said heads, and nuts on said ends outside the heads.

2. A rotary broom, comprising longitudinal sections each having parallel rods with threaded projecting ends and being adapted to contain a row of doubled reeds, circular heads for the opposite ends of the brooms each having near its margin a series of groups of perforations, each group being adapted to receive the said projecting rod ends of a broom-section, and clamping-nuts on the said rods outside said heads.

3. A rotary broom, comprising circular end pieces or heads each having a series of groups of perforations near its margin, broom-sections each adapted to hold a row of doubled reeds and having at its ends projecting rods adapted to enter the perforations of one of said groups, and nuts on the ends of said rods, each of said broom-heads being formed in two semicircular halves hinged together at one end of their meeting edges and adapted at the other end to receive a clamping-bolt.

4. A rotary broom, comprising longitudinally-disposed sections each holding a row of doubled reeds and having at its ends projecting rod ends, opposite heads or ends each providing a circular series of groups of perforations adapted to receive the ends of the rods of said sections, each of said heads having a square central aperture surrounded by a lateral flange and being divided into two semicircular halves diagonally of said aperture which halves have means for separably joining together, and boards extending from head to head parallel to the broom-sections and resting at their ends upon said flanges.

5. A rotary broom, comprising longitudinal sections having rods projecting at the ends of said sections, opposite broom ends or heads perforated to receive said projecting rods, nuts upon the outer ends of said rods, and an intermediate band clamped around said sections between the said ends or heads.

6. In a rotary broom, longitudinally-disposed removable sections, each comprising a series of parallel transverse plates each having a plurality of perforations in alinement with those of the other plates, a rod extending through one line of said perforations, means for holding said plates fixed on said rod, and other rods extending through the other lines of perforations in slidable relation to the plates.

7. In a rotary broom, longitudinal sections each having a central portion with transverse perforated plates thereon, reeds doubled over said central portion, removable rods mounted in said plates at the outer sides of said doubled reeds, and means for connecting said sections in cylindrical series.

8. In a rotary broom, longitudinally-disposed broom-sections, each comprising a series of transverse plates having a plurality of perforations, a rod extending through one series of said perforations and having tubular braces arranged thereon between the sections, clamping-nuts on said rods outside the endmost plates, and other rods extending through said plates and being devoid of braces.

9. In a rotary broom, a series of longitudinal sections each comprising a series of transverse plates each having at its outer ends from the axis of the broom a row of three perforations and having at the inner end a centrally-disposed perforation, rods extending through said perforations, and reeds doubled around the inner rod and having their ends extending on opposite sides of the middle rod of the outer row and lying inside the end rods of said row.

10. In a rotary broom, the combination with longitudinal sections each comprising a series of parallel rods, transverse plates arranged on said rods, pieces of tubing on one of said rods between the successive plates, clamping-nuts on said rod outside the endmost plates, and reeds held by said rods, of opposite heads or end plates having a circular series of groups of perforations, each adapted to receive the projecting ends of the rods of a broom-section, the perforation for the ends of the said rod having pieces of tubing thereon being large enough to receive the nut thereof also, and nuts upon the ends of the other rods outside said broom-heads.

11. A rotary broom comprising a cylindrical series of separable and independent frame-sections each having a central portion around which reeds may be doubled, straight rods on opposite sides of said central portions each adapted to lie outside the doubled reeds and separate them from the next adjacent section, means holding said rods against lateral movement and permitting independent longitudinal sliding, and opposite end pieces or broom-heads provided with seats for the ends of said frame-sections.

12. A broom composed of separable longitudinal sections each comprising a central longitudinal portion around which reeds may be bent, a series of transverse plates upon said central portion adapted to separate the reeds into groups, said plates being perforated at opposite sides of the said central portion in alinement with one another, holding-rods in said perforations at the sides of the central portion and being longitudinally slidable, and means at the ends of said sections for holding the same in cylindrical series and preventing relative movement of their said parts.

In testimony that I claim the foregoing I have hereunto set my hand this 3d day of November, 1902.

LOUIS J. REMMELE.

Witnesses:
C. B. PITNEY,
RUSSELL M. EVERETT.